United States Patent
Pajak et al.

(10) Patent No.: US 9,576,340 B2
(45) Date of Patent: Feb. 21, 2017

(54) RENDER-ASSISTED COMPRESSION FOR REMOTE GRAPHICS

(71) Applicant: NVIDIA CORPORATION, Santa Clara, CA (US)

(72) Inventors: Dawid Stanislaw Pajak, San Jose, CA (US); David Luebke, Charlottesville, VA (US); Scott Saulters, New Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 738 days.

(21) Appl. No.: 13/727,216

(22) Filed: Dec. 26, 2012

(65) Prior Publication Data

US 2014/0028703 A1    Jan. 30, 2014

Related U.S. Application Data

(60) Provisional application No. 61/677,430, filed on Jul. 30, 2012.

(51) Int. Cl.
| | |
|---|---|
| *G06T 5/00* | (2006.01) |
| *G06T 11/00* | (2006.01) |
| *G06T 1/20* | (2006.01) |
| *G06T 9/00* | (2006.01) |
| *H04N 19/46* | (2014.01) |
| *H04N 19/61* | (2014.01) |

(52) U.S. Cl.
CPC . *G06T 5/00* (2013.01); *G06T 1/20* (2013.01); *G06T 9/004* (2013.01); *G06T 11/00* (2013.01); *H04N 19/46* (2014.11); *H04N 19/61* (2014.11)

(58) Field of Classification Search
CPC .... H04N 19/46; H04N 19/61; H04N 1/32101; H04N 21/431; H04N 13/0066; H04N 2201/3278; G06T 1/20; G06T 9/004; G06F 3/14
See application file for complete search history.

(56) References Cited

U.S. PATENT DOCUMENTS

| | | | |
|---|---|---|---|
| 5,262,867 A | 11/1993 | Kojima | |
| 7,274,368 B1 * | 9/2007 | Keslin | 345/522 |

(Continued)

FOREIGN PATENT DOCUMENTS

| | | |
|---|---|---|
| EP | 2098994 A1 | 9/2009 |
| WO | 01/82224 A2 | 11/2001 |

OTHER PUBLICATIONS

Non-Final Office Action dated Jul. 2, 2014 for U.S. Appl. No. 13/727,265, 16 pages.

(Continued)

*Primary Examiner* — Ryan R Yang
(74) *Attorney, Agent, or Firm* — Artegis Law Group, LLP

(57) ABSTRACT

A technique for efficiently compressing rendered three-dimensional images in a remote rendering system adds a novel render-assisted prediction function to an existing video compression framework, such as the standard H.264/5 framework. Auxiliary rendering information is separated from rendering information used to describe a reference image by a server system. A client system may alter the auxiliary data and generate a new image based on the reference image and rendered scene information from the auxiliary data without creating additional network bandwidth or server workload.

23 Claims, 8 Drawing Sheets

(56) References Cited

U.S. PATENT DOCUMENTS

| | | |
|---|---|---|
| 2002/0015042 A1* | 2/2002 | Robotham et al. ............ 345/581 |
| 2004/0221004 A1 | 11/2004 | Chalfin et al. |
| 2008/0246768 A1 | 10/2008 | Murray et al. |
| 2009/0016641 A1 | 1/2009 | Paladini et al. |
| 2009/0210778 A1 | 8/2009 | Kulas et al. |
| 2009/0284442 A1* | 11/2009 | Pagan ............................ 345/2.1 |
| 2010/0303146 A1* | 12/2010 | Kamay ................... 375/240.02 |
| 2010/0306413 A1* | 12/2010 | Kamay ......................... 709/247 |
| 2011/0200119 A1* | 8/2011 | Aso .......................... 375/240.25 |
| 2012/0093214 A1 | 4/2012 | Urbach |
| 2012/0293509 A1* | 11/2012 | Barnsley ....................... 345/419 |
| 2013/0080504 A1* | 3/2013 | Maurer et al. ................ 709/203 |

OTHER PUBLICATIONS

Search Report with date of search Jan. 31, 2014, Application No. GB1312957.2, 2 pages.

* cited by examiner

RENDER-ASSISTED COMPRESSION FOR REMOTE GRAPHICS

CROSS-REFERENCE TO RELATED APPLICATIONS

This application claims benefit of U.S. provisional patent application Ser. No. 61/667,430, filed Jul. 30, 2012, which is hereby incorporated herein by reference.

BACKGROUND OF THE INVENTION

Field of the Invention

The present invention generally relates to computer graphics and, more specifically, to render-assisted compression for remote graphics.

Description of the Related Art

Remote rendering is a technique for rendering graphics images on a server and transmitting the images to a client device via an intervening data network. Multiple servers may operate from a controlled machine room environment to provide highly reliable service to many different client devices. Each server may be a relatively high-end computing platform with high-performance CPUs and GPUs, fast access to large arrays of on-line storage, and high-speed local networking to other servers that may be, for example, participants in a distributed application. Each server is typically configured to provide significantly more processing, storage, and internetworking capacity than a typical client device, while each client device is configured to provide networking connectivity, certain graphics functions, and a display system. A client device may be portable or mobile and provide a highly convenient user experience.

In one conventional remote rendering technique, a server renders both a high-quality image and a low-quality image for each frame, and transmits a difference image for the frame. A client device renders just the low-quality image and uses the difference image to reconstruct a high-quality image. In certain scenarios and for certain specific frames, this technique requires less network bandwidth than simply transmitting a conventionally compressed high-quality image. In some scenarios, the client device requires more power to perform image reconstruction on a certain frame than conventional image decompression requires for the same frame. One significant disadvantage of this technique is that little advantage is gained, if any, relative to conventionally compressing and transmitting each frame.

Other techniques involve image warping and spatial and temporal up-sampling of transmitted data. However, these techniques conventionally require explicit application-level control of processing, limiting general applicability.

As the foregoing illustrates, what is needed in the art is an efficient technique for remote rendering.

SUMMARY OF THE INVENTION

One embodiment of the present invention sets forth a method for transmitting rendered images to a remote client device, the method comprising rendering one or more server rendering elements to generate a reference image, rendering one or more client rendering elements to generate a client auxiliary image, compressing the reference image and the client auxiliary image or the reference image and auxiliary data to generate compressed client data, and transmitting the compressed client data to the remote client device for display.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that it improves compression rates in a remote rendering system. A second advantage is that the technique may be implemented to be backwards compatible with existing video compression techniques. A third advantage is that client-side rendering of certain frames or certain portions of frames reduces server workloads, and enables greater server scalability.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
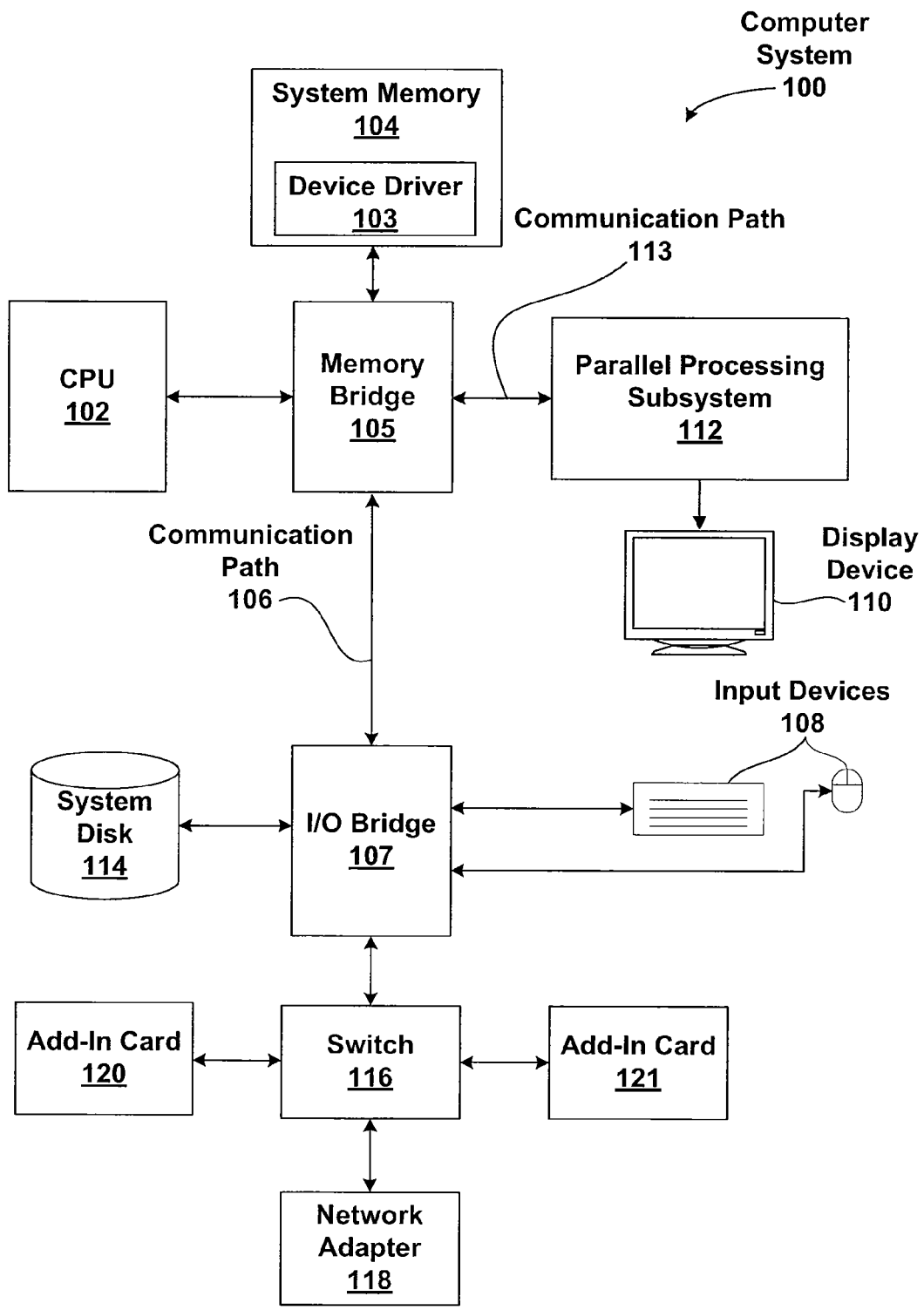
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
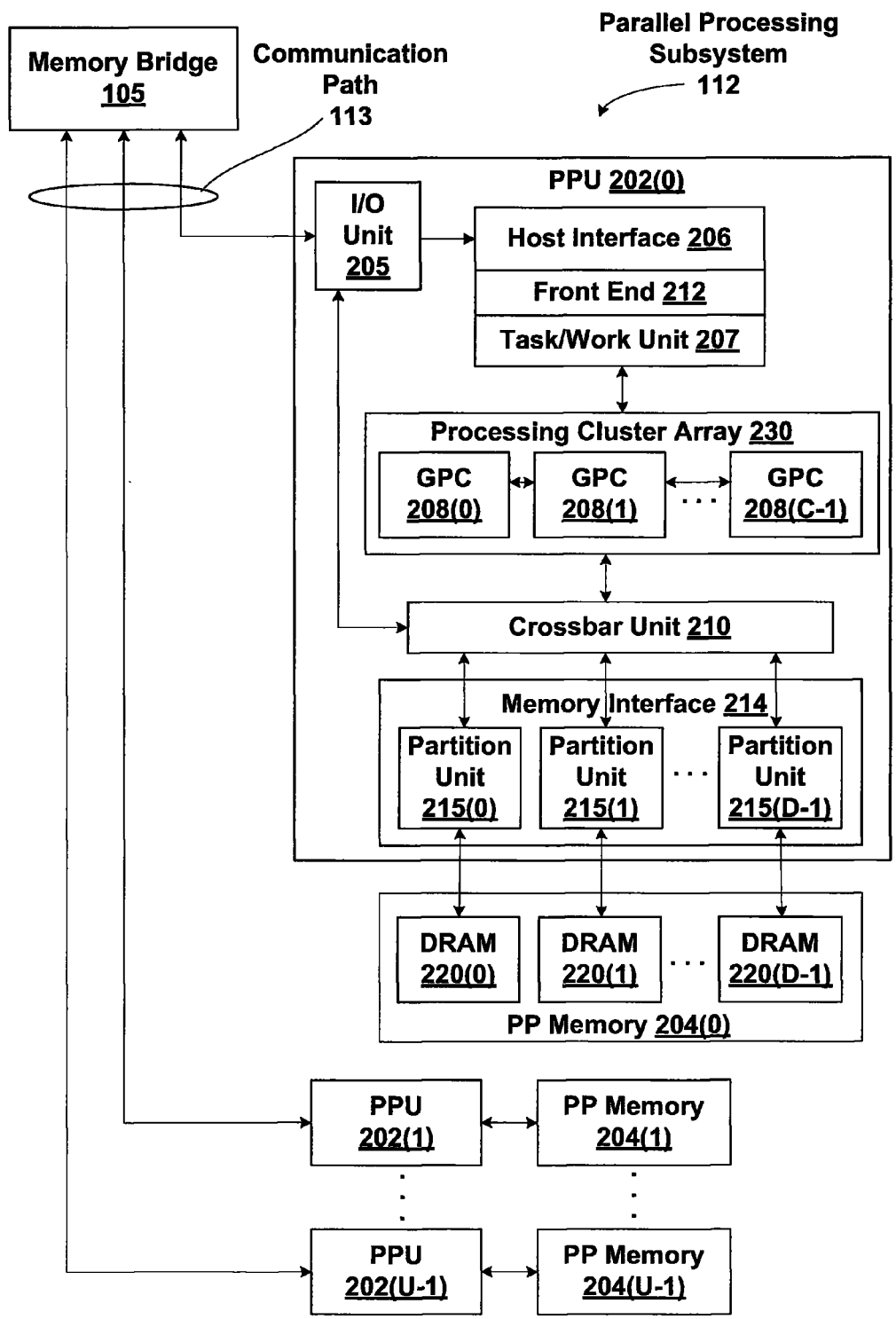
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/ work unit 207 receives the tasks and dynamically schedules the processing tasks and child processing tasks for execution by the GPCs 208.

Figure 3:
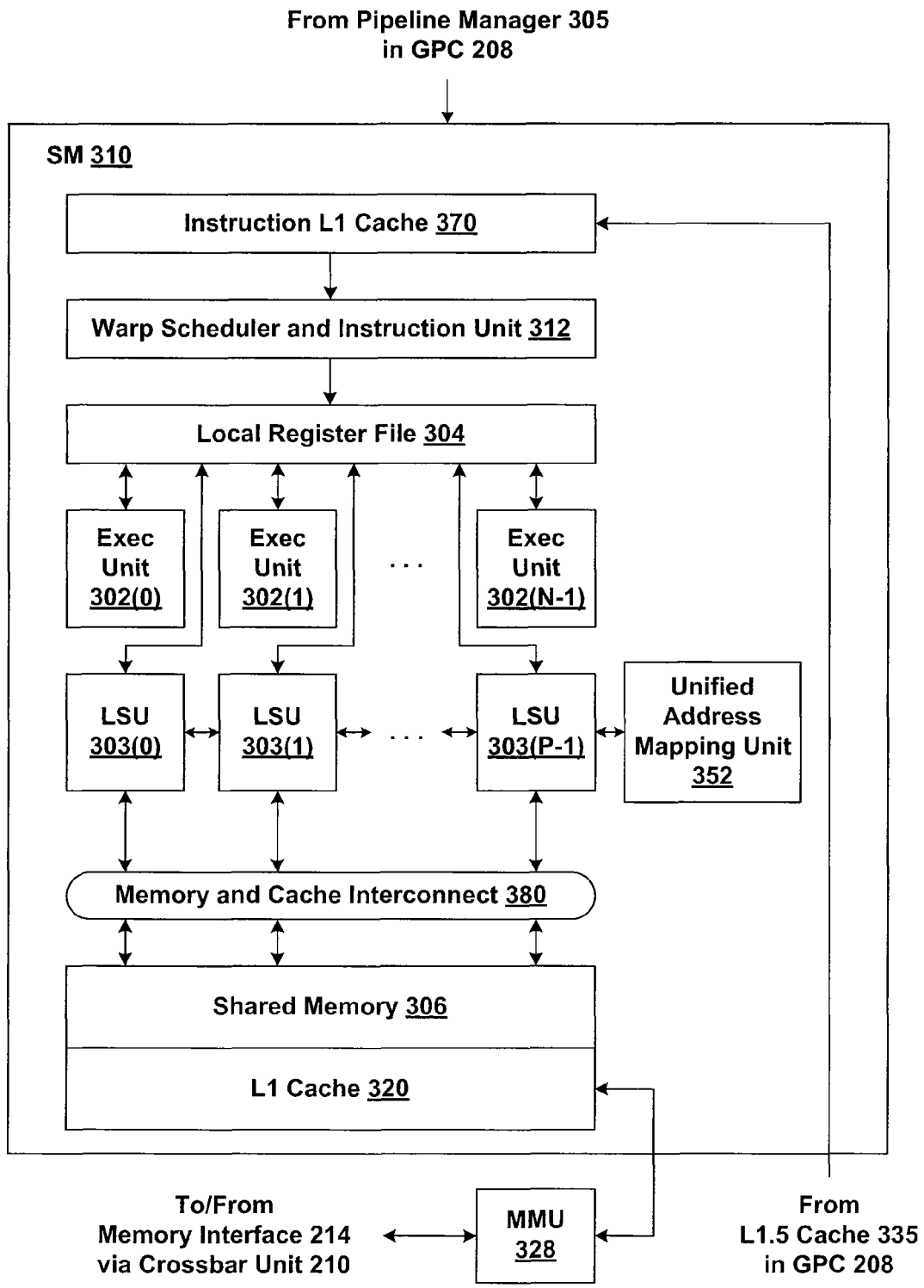
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
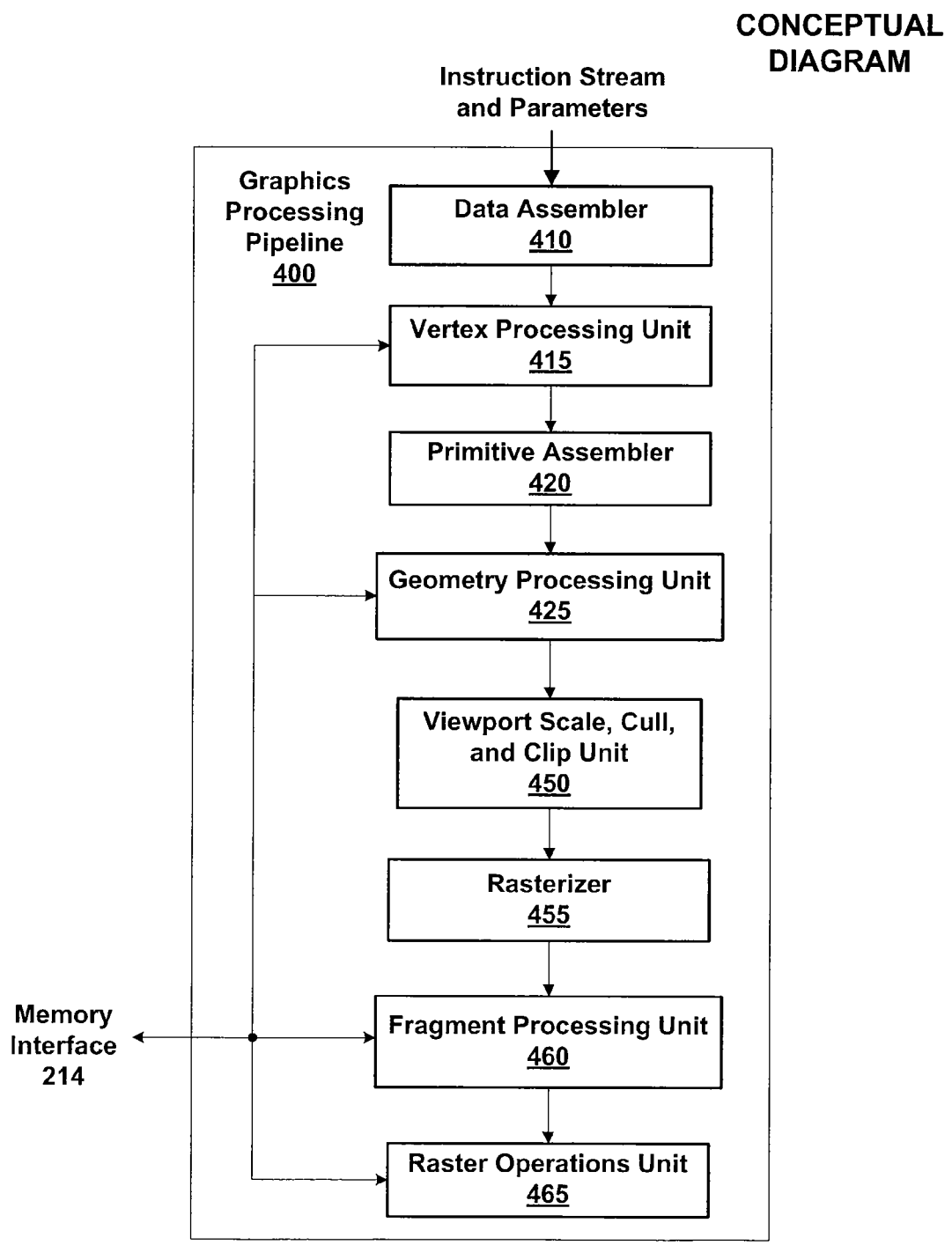
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and color raster operations (CROP) unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to CROP unit 465. Fragment processing unit 460 may read data that is stored in parallel processing memory 204 or system memory 104 for use in processing the fragment data. Fragments may be shaded at pixel, sample, or other granularity, depending on the programmed sampling rate.

CROP unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In certain embodiments, each pixel comprises multiple color samples. In such embodiments, CROP unit 465 is configured to compress z sample data, color sample data, or any combination thereof that is written to memory and decompress z sample data and color sample data that is read from memory. The goal of this compression technique is not to reduce the size of an image in memory, but rather to reduce processing associated with the image by representing all samples for a given pixel by one set of sample values that require processing. In a typical scene, a majority of pixels comprise color samples of equal value and this compression technique enables improved processing performance. Multiple color samples are combined to generate an anti-aliased pixel within a resulting image for display or further processing. When all color samples associated with a particular pixel are equal in value, one color sample is stored for the pixel and status information for the pixel is set to indicate that the samples are compressed. In one embodiment, samples associated with a pixel will have equal color when a corresponding fragment fully covers the pixel. Color samples for each pixel within the image may be combined to generate an anti-aliased pixel for display.

Server-Client System for Remote Render

Figure 5:
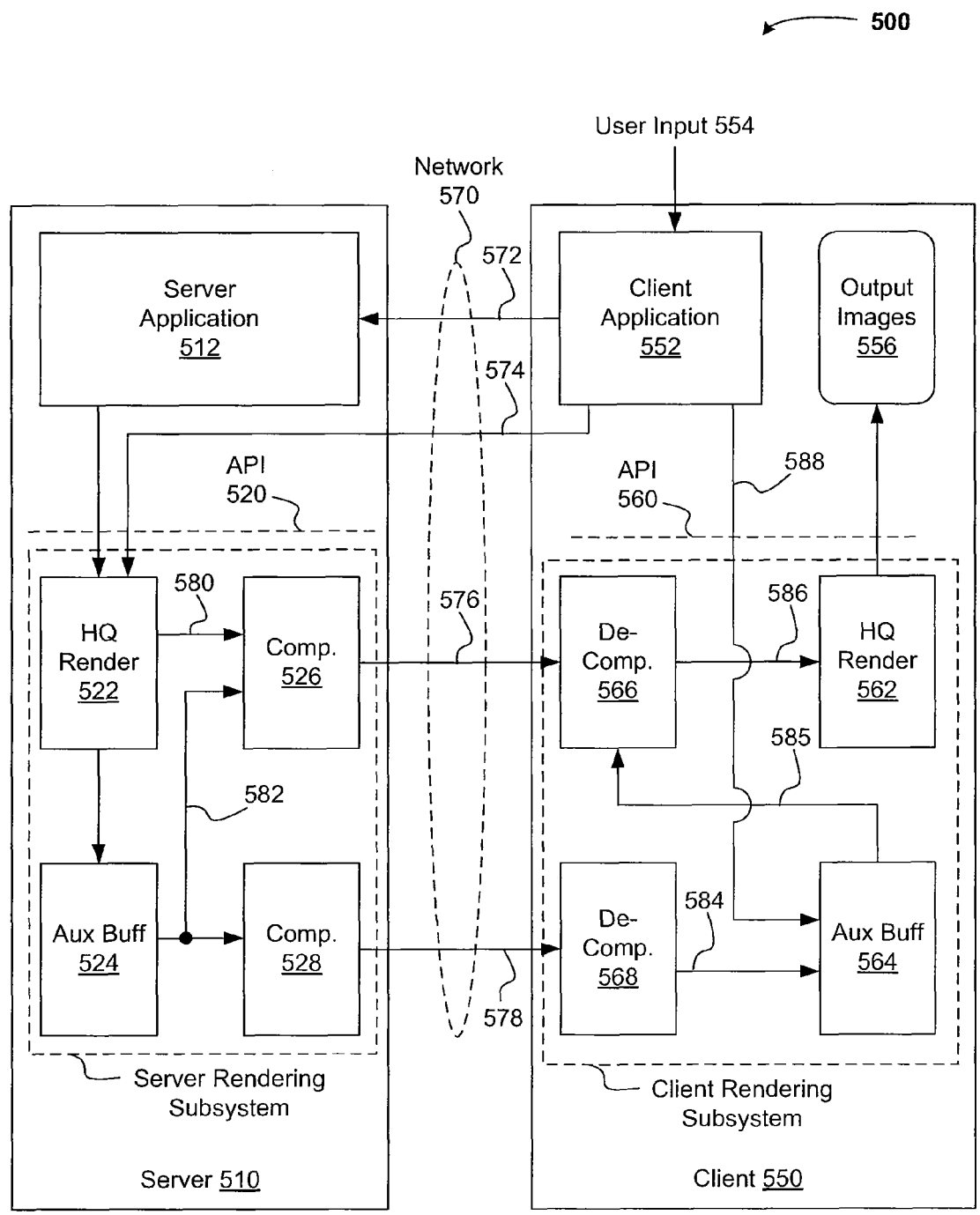
FIG. 5 illustrates a remote rendering system, according to one embodiment of the present invention.

FIG. 5 illustrates a remote rendering system 500, according to one embodiment of the present invention. A server 510 is coupled to at least one client 550 via network 570, which may comprise wired or wireless communication links for local area or wide area communication. A client application 552 executing on client 550 is configured to communicate with a server application 512 executing on server 510 to cooperatively render output images 556 for display on client 550. Client application 552 may receive user input 554, such as position input from a joystick, mouse, or touchpad, and character input, such as input from a keyboard. Client device 552 processes user input 554 to generate user controls 572, which are then transmitted to server application 512. Client application 552 may optionally transmit rendering requests 574 to server 510 to direct certain aspects of rendering. In one embodiment server 510 is implemented according to computer system 100 of FIG. 1. Similarly, client 550 may be implemented according to computer system 100.

Server application 512 renders graphics scenes for display by client 550 as output images 556. Server application 512 maintains a set of geometric objects that represent scene objects, as well as related scene information, such as textures, programmable shaders, and the like, which may be transmitted to high-quality (HQ) render module 522 via application programming interface (API) 520. HQ render module 522 may store certain rendering information, such as depth, overlay objects such as lens flare effects, and the like as auxiliary data in a set of auxiliary buffers 524. Compression module 528 performs compression operations on auxiliary data 582 to generate compressed auxiliary data 578. Auxiliary data 582 includes depth information and other information required to complete a final image rendering. Compression module 526 performs compression operations on reference image data 580 and auxiliary data 582 to generate compressed image data 576. In one embodiment, compression module 526 determines which one of potentially several compression techniques provide a highest compression rate on an incremental basis, such as on a frame or a macroblock basis. In one embodiment, compression module 526 may determine that transmitting a given fully rendered macroblock, comprising both reference image data and rendered auxiliary data 582 is more efficient than transmitting the macroblock comprising only reference image data 580, with client 550 providing any remaining rendering passes. In such a case, compression module 526 may transmit the macroblock as a fully rendered macroblock. In other embodiments, client 550 always provides the remaining rendering passes.

Decompression module 568 operates on compressed auxiliary data 578 to generate auxiliary data 584, for storage within auxiliary buffer 564. Decompression module 566 operates on compressed image data 576 and auxiliary buffer data 585 to generate local rendering information 586. In one embodiment auxiliary data 584 comprises an ordered stream of auxiliary data, while auxiliary buffer data 585 may be accessed from auxiliary buffer 564 in arbitrary order. Local rendering information 586 is transmitted to HQ render module 562 for final rendering into one or more output images 556 for display. In one embodiment, HQ render module 522 is implemented within a graphics processing unit, such as graphics processing pipeline 400 of FIG. 4. Similarly, HQ render module 562 is implemented in a potentially different graphics processing unit comprising a different implementation of graphics processing pipeline 400. In one embodiment, client application 552 transmits client auxiliary data 588 via API 560. Client auxiliary data 588 may be used to modify portions or presentation attributes of an output image.

In one embodiment, compressed image data 576 conforms semantically to a conventional video encoding framework, such as MPEG (H.264/5), with an addition of novel prediction modes for macroblock coding, disclosed herein. In contrast to conventional prediction modes, which work only in image-space, the disclosed predictor is aware of three-dimensional (3D) rendered content and performs prediction and rendering based on 3D attributes. Examples of 3D prediction attributes include, without limitation, scene geometry, texture images, rendering pass information, shader functionality, depth buffer information, and camera position. Each of these exemplary 3D attributes may be compressed efficiently and streamed in real-time. Extraction and transmission of related intermediate rendering data to client 550 may be performed in API 520, for transparent operation with respect to server application 512. By operating within an H.264/5 framework, compressed image data 576 may be generated to be advantageously backwards compatible with conventional decompression modules, enabling deployment of diverse client devices coupled to server 510.

Figure 6:
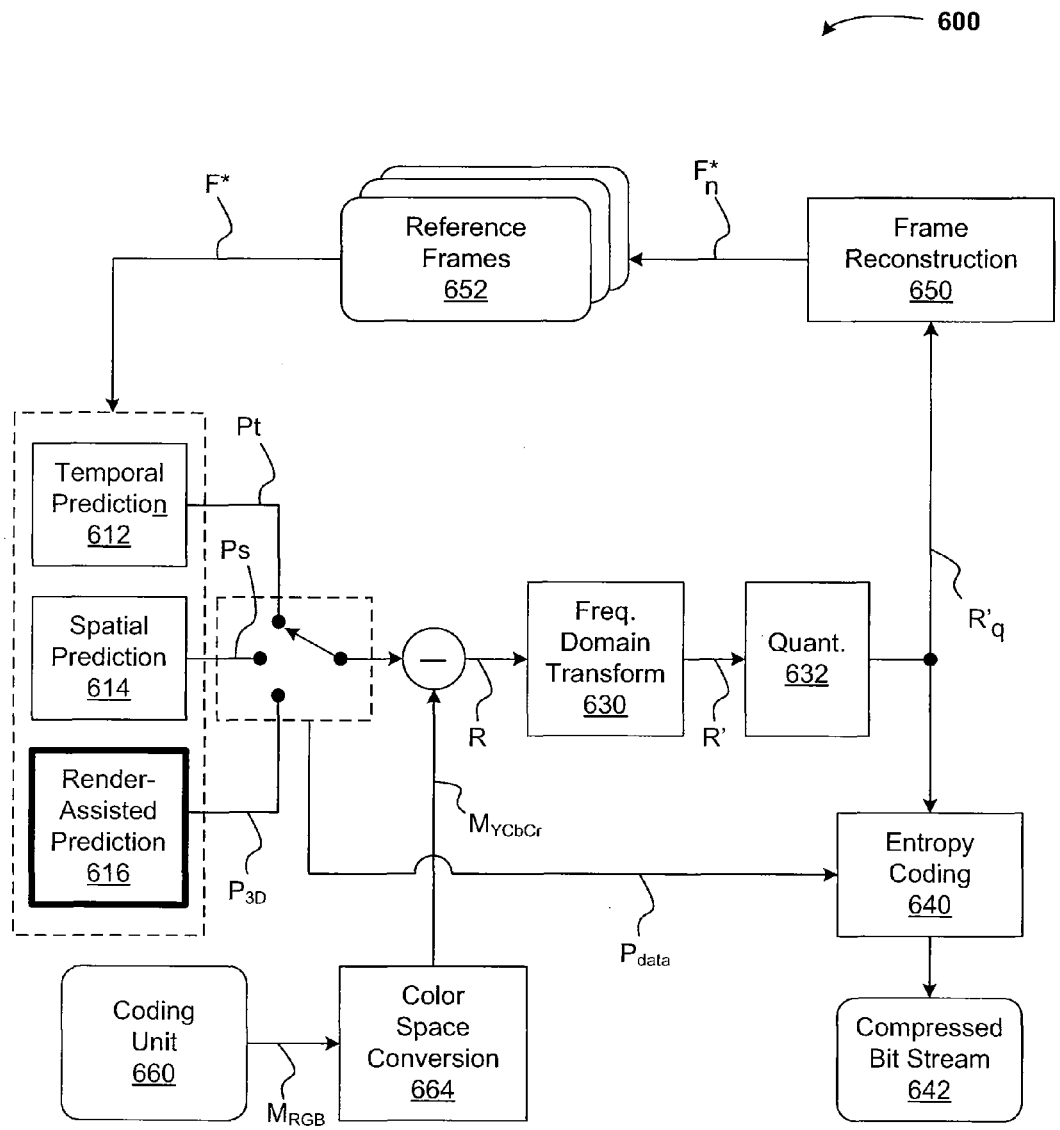
FIG. 6 illustrates an image compression subsystem configured to perform render-assisted prediction, according to one embodiment of the present invention.

FIG. 6 illustrates an image compression subsystem 600 configured to perform render-assisted prediction, according to one embodiment of the present invention. In one embodiment, compression subsystem 600 is implemented within compression module 526 of FIG. 5, and may be implemented within compression module 528. As shown, compression subsystem 600 may be implemented to be structurally consistent with an H.264/5 compression module, with the novel addition of a render-assisted prediction function 616.

In one embodiment, image compression subsystem 600 operates on an input image organized as macroblocks. A particular macroblock comprises a coding unit 660 that includes macroblock pixel data (MRGB) represented in red-green-blue color space. Color space conversion unit 664 converts the macroblock pixel data into an intensity-chroma (YUV) space representation (MYCbCr). A temporal prediction function 612, spatial prediction function 614 and render-assisted prediction function 616 each generated respective prediction data candidates (Pt, Ps, P3D). Residual macroblock data R represents difference information between a current macroblock and a subsequent macroblock. Frequency domain transform module 630 generates a frequency domain representation R' of macroblock data R. Quantization module 632 generates a quantized frequency domain representation Rq' of the frequency domain representation R' based on bandwidth and model controls. The quantized frequency domain representation is transmitted to a frame reconstruction function 650 for generating a local reference frames 652 used for subsequent compression steps. The quantized frequency domain representation is also transmitted to entropy coding module 640 for generating a compressed bit stream 642 included in compressed image data 576.

In one embodiment, optimal residual data selected among the prediction data candidates is performed, and P3D data is transmitted to entropy coding module 640 as Pdata for inclusion in compressed bit stream 642. Persons skilled in the art will recognize that certain 3D graphics data, such as geometric information and shader program code, are not appropriately compressed via transformation to frequency domain and quantization and therefore require a bypass path to entropy coding module 640.

In normal operation, HQ render module 522 generates a high-quality rendering of the frame to generate reference image data 580, which may be compressed by compression module 526. In the process, macroblocks comprising the scene are rendered. Furthermore, auxiliary data related to additional rendering passes for a given frame, or an alternative representation of the frame may be transmitted to auxiliary buffer 524. The auxiliary data may apply to all or a subset of the macroblocks. Rendering operations performed by client 550 are directed by the auxiliary data. The auxiliary data may be used by client 550 to perform, without limitation, depth-based image warping, spatial/temporal/spatio-temporal up-sampling, simplified scene rendering. Depth-based warping may be performed based on a predictor function that processes previous frame depth buffer information, previous frame color buffer information, current and previous camera transformation matrices, and current frame depth buffer information. Spatial/temporal/spatio-temporal up-sampling may be performed using a predictor function that processes a low-resolution color buffer ad a high-resolution depth buffer, or a current low-resolution color buffer, current high-resolution depth buffer, a motion buffer, and current and previous camera transformation matrices. Simplified scene rendering may be performed based on a predictor function that processes full or simplified scene geometry, full or simplified textures, and simplified shading passes.

In certain common operating scenarios, data packets within network 570 may be delayed, corrupted, or lost altogether. Such transmission errors may be detected by client 550. While a packet re-try strategy may work for certain types of data, this type of strategy is poorly suited to latency sensitive applications such as real-time interactive rendering. To gracefully conceal certain common transmission errors that would otherwise degrade image quality, client 550 may render one or more frames for display based on scene data that is locally available. In one example, depth information transmitted from server 510 to a local auxiliary buffer within client 550 may be used to perform forward warping operations to render one or more sequential frames for display. In doing so, frames that would otherwise be impacted by certain transmission errors may be rendered to a high degree of quality based on information that is local to client 550. In another example, geometry information within a local auxiliary buffer may be used to render the one or more sequential frames for display by client 550. In one embodiment, a wireless data network couples client 550 to server 510. In such an embodiment, data corruption and loss is a common occurrence, and client 550 should employ concealment strategies, such as forward warping.

In one embodiment, API 520 intercepts and repurposes API rendering commands transparently with respect to the operation of server application 512. Because render-assisted prediction function 616 operates within the framework of image compression subsystem 600, compression granularity is at the macroblock level. As such, only data related to selected macroblocks that need to be updated for a given frame needs to be transmitted to client 550. And client 550 need only render content or portions of content related to the selected macroblocks.

Figure 7:
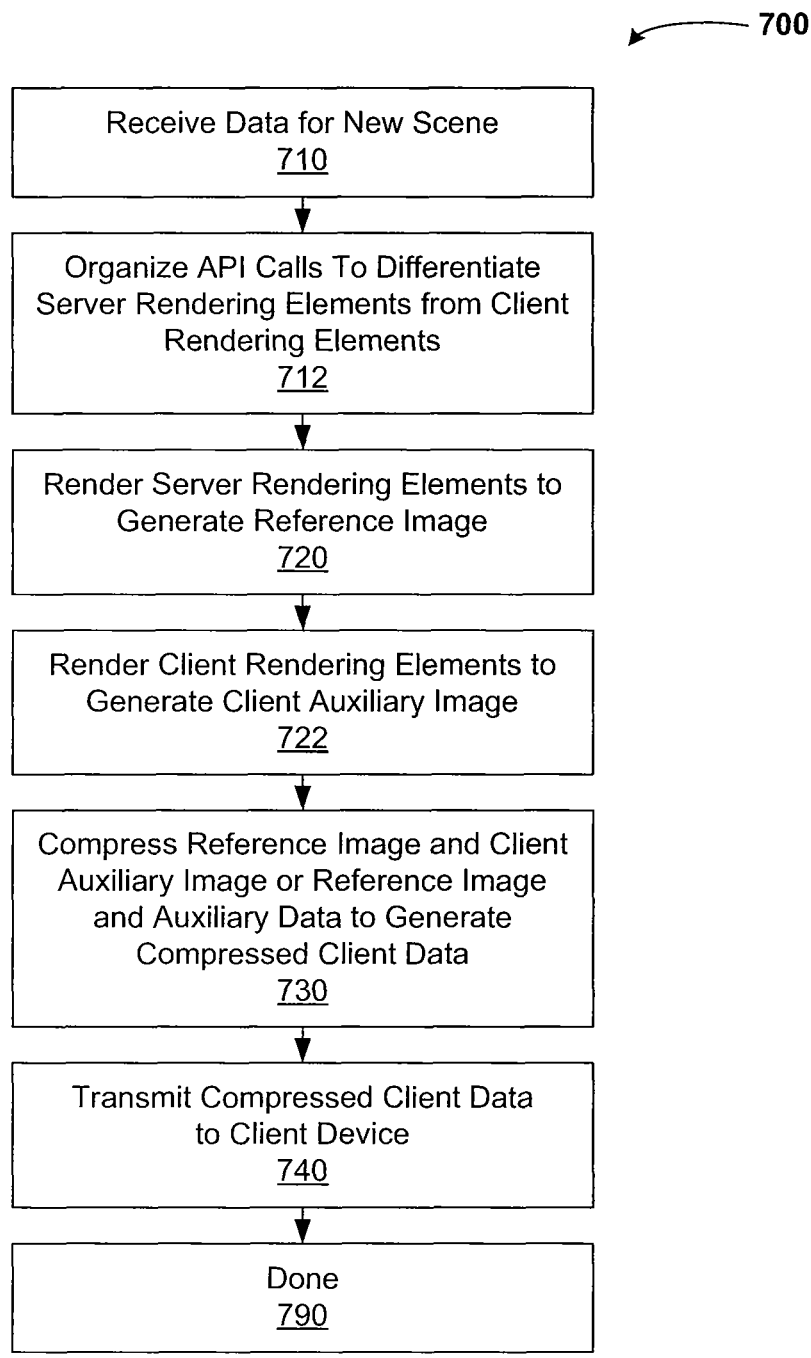
FIG. 7 is a flow diagram of method steps for performing render-assisted compression, according to one embodiment of the present invention.

FIG. 7 is a flow diagram of method steps for performing render-assisted compression, according to one embodiment of the present invention. Although the method steps are described in conjunction with the systems of FIGS. 1-6, persons of ordinary skill in the art will understand that any system configured to perform the method steps, in any order, is within the scope of the invention. In one embodiment, the method steps are performed by a server, such as server 510 of FIG. 5.

As shown, a method 700 begins in step 710, where a rendering subsystem within the server receives scene data from a new scene via an API, such as API 520. The scene data represents a complete description of a given frame of image data. In one embodiment, the rendering subsystem comprises driver 103 and parallel processing subsystem 112 of FIG. 1. The scene data may include, without limitation, geometric data, texture information, shader information, and information related to different rendering passes. In step 712, the rendering subsystem organizes the scene data to differentiation scene data related to server rendering elements and scene data related to client rendering elements. Each rendering element may comprise an arbitrary element of the scene data. This step is performed transparently within API 520.

In step 720, the rendering subsystem renders server rendering elements to generate reference image data 580. In step 722, the rendering subsystem renders client rendering elements, such as auxiliary data 582, to generate a client auxiliary image. The client auxiliary image, when added to the reference image, comprises a complete rendered frame of a given scene. Client 550 may modify auxiliary data and render a new frame for the scene based on a locally rendered client auxiliary image and the reference image. Furthermore, Client 550 may modify the reference image via warping operations, modify a client auxiliary image, regenerate a client auxiliary image based on warping operations, or any combination thereof. In this way, client 550 may generate one or more additional frames for display without requiring additional network bandwidth or server workload.

In step 730, the rendering subsystem compresses the reference image data 580 and the client auxiliary image, or the reference image data 580 and auxiliary data 582 to generate compressed image data 576 and compressed auxiliary data 578, which collectively comprise compressed client data. In one embodiment compressed bit stream 642 of FIG. 6 comprises the compressed client data. A given macroblock associated with reference image data 580 may correspond to a coding unit 660. In step 740, the rendering subsystem causes server 510 to transmit the compressed client data to a client device, such as client 550. The method terminates in step 790.

Persons skilled in the art will recognize that the above steps may be performed within a plurality of different context on a single server 510 to provide rendering services to a set of corresponding client devices.

Figure 8:
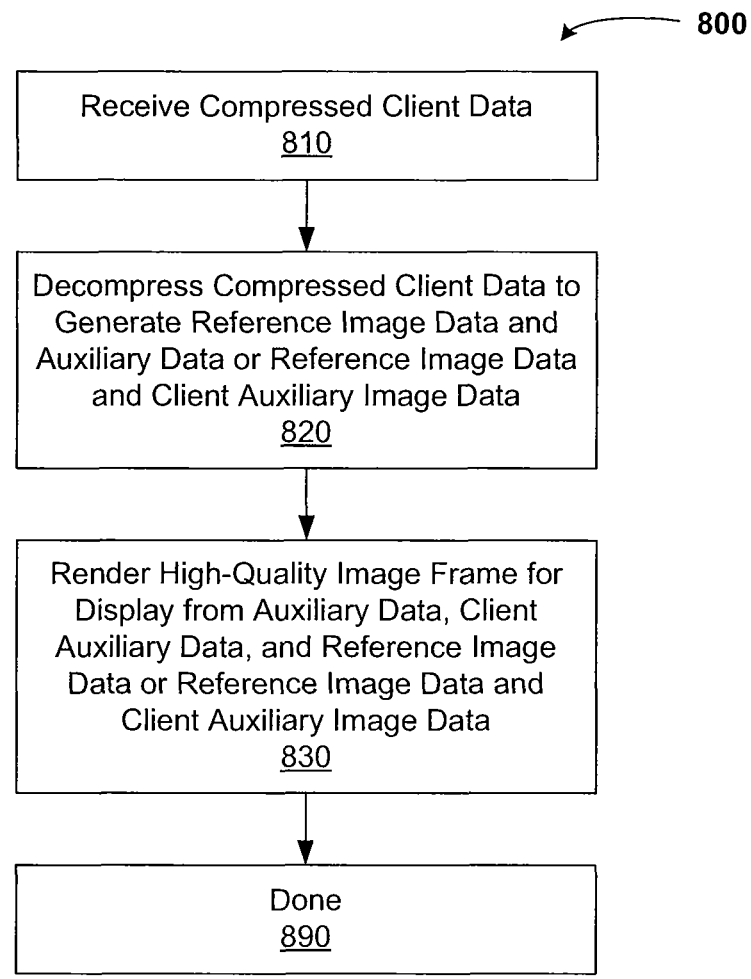
FIG. 8 is a flow diagram of method steps for performing render-assisted decompression, according to one embodiment of the present invention.

FIG. 8 is a flow diagram of method steps for performing render-assisted compression, according to one embodiment of the present invention. Although the method steps are described in conjunction with the systems of FIGS. 1-6, persons of ordinary skill in the art will understand that any system configured to perform the method steps, in any order, is within the scope of the invention. In one embodiment, the method steps are performed by a client device, such as client 550 of FIG. 5.

As shown, a method 800 begins in step 810, where a rendering subsystem within the client device receives compressed client data comprising compressed image data and compressed auxiliary data from a server, such as server 510. In step 820, the rendering subsystem decompresses the compressed client data to generate reference image data and auxiliary data 584 or reference image data and client auxiliary image data. In one embodiment, local rendering information 586 comprises decompressed reference image data and local auxiliary data. The local auxiliary data may include an arbitrary combination of auxiliary data 584 and client auxiliary data. In step 830, the rendering subsystem renders a high-quality image frame for display as an output image based on the decompressed reference image data, the auxiliary data 584, and client auxiliary data 588. The method terminates in step 890.

Application 552 may be configured to generate client auxiliary data 588 to provide temporal up-sampling, such as to generate intervening frames between fully rendered frames generated by server 510. For example, server 510 may be configured to fully render only every other frame of output images 556, with client application 552 generating auxiliary data, such as image warping to accommodate camera transforms related to alternate frames, which can be rendered locally based on a previous frame of decompressed reference image data. In another example, lens flare may be rendered locally on client 550 as a semi-transparent overlay on top decompressed reference image data.

In sum, a technique is disclosed for efficiently compressing frames of rendered 3D images in a remote rendering system. Scene data that defines a complete 3D image is separated at an API boundary into reference image data and auxiliary data. The reference image data is rendered independently from the auxiliary data. The rendered image data and auxiliary data are compressed within a modified image compression framework, such as H.264/5. The modification to a conventional compression framework comprises a render-assisted prediction function responsive to 3D information. Auxiliary data is compressed by an entropy coding function to be semantically consistent with compressed reference image data. A client device decompresses reference image data and auxiliary data to render a high quality image. The client device may modify the auxiliary data and re-render a different high quality image based, in part on the reference image data. The different high quality image may comprise a subsequent frame in a video sequence.

One advantage of the disclosed technique is that it improves compression rates in a remote rendering system. A second advantage is that the technique maybe implemented to be backwards compatible with existing video compression techniques. A third advantage is that client-side rendering of certain frames or certain portions of frames reduces server workloads, and enables greater server scalability.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for transmitting rendered images to a remote client device, the method comprising:
    rendering one or more server rendering elements to generate a reference image;
    rendering one or more client rendering elements comprising auxiliary data to generate a client auxiliary image, wherein the auxiliary data comprises rendering information for rendering the reference image;
    compressing the reference image and the client auxiliary image or the reference image and auxiliary data to generate compressed client data; and
    transmitting the compressed client data to the remote client device for display.

2. The method of claim 1, wherein each server rendering element comprises one or more graphics operations configured to be executed on a server machine.

3. The method of claim 2, wherein each client rendering element comprises one or more graphics operations configured to be executed on the server machine and the remote client device.

4. The method of claim 3, further comprising organizing a set of application programming interface (API) calls to differentiate the one or more server rendering elements from the one or more client rendering elements.

5. The method of claim 1, wherein the auxiliary data comprises graphics instructions for performing at least one rendering pass on the reference image.

6. The method of claim 1, further comprising comparing an amount of data associated with the client auxiliary image to an amount of data associated with the auxiliary data.

7. The method of claim 6, wherein the reference image and the client auxiliary image are compressed to generate the compressed client data if the amount of data associated with the client auxiliary image is less than the amount of data associated with the auxiliary data.

8. The method of claim 6, wherein the reference image and the auxiliary data are compressed to generate the compressed client data if the amount of data associated with the auxiliary data is less than the amount of data associated with the client auxiliary image.

9. The method of claim 1, wherein compressing the auxiliary data comprises applying a render-assisted prediction function to the auxiliary data.

10. The method of claim 9, wherein compressing the reference image comprises entropy encoding at least a portion of the reference image.

11. The method of claim 1, wherein the auxiliary data comprises depth information associated with the reference image.

12. The method of claim 1, wherein the auxiliary data comprises lens flare effect information associated with the reference image.

13. A server system, comprising:
    a rendering subsystem configured to:
        render one or more server rendering elements to generate a reference image;
        render one or more client rendering elements comprising auxiliary data to generate a client auxiliary image, wherein the auxiliary data comprises rendering information for rendering the reference image;
        compress the reference image and the client auxiliary image or the reference image and auxiliary data to generate compressed client data; and
        transmit the compressed client data to the remote client device for display.

14. The server system of claim 13, wherein each server rendering element comprises one or more graphics operations configured to be executed on a server machine.

15. The server system of claim 14, wherein each client rendering element comprises one or more graphics operations configured to be executed on the server machine and the remote client device.

16. The server system of claim 13, wherein the auxiliary data comprises graphics instructions for performing at least one rendering pass on the reference image.

17. The server system of claim 13, wherein the rendering subsystem is further configured to compare an amount of data associated with the client auxiliary image to an amount of data associated with the auxiliary data.

18. The server system of claim 17, wherein the reference image and the client auxiliary image are compressed to generate the compressed client data if the amount of data associated with the client auxiliary image is less than the amount of data associated with the auxiliary data.

19. The server system of claim 17, wherein the reference image and the auxiliary data are compressed to generate the compressed client data if the amount of data associated with the auxiliary data is less than the amount of data associated with the client auxiliary image.

20. The server system of claim 13, wherein the rendering subsystem is configured to compress the auxiliary data by applying a render-assisted prediction function to the auxiliary data.

21. The server system of claim 20, wherein the rendering subsystem is configured to compress the reference image by entropy encoding at least a portion of the reference image.

22. The server system of claim 13, wherein the rendering subsystem includes:
    a render module configured to generate the reference image and the client auxiliary image; and a first compression module to compress the reference image and the client auxiliary image or the reference image and the auxiliary data to generate the compressed client data.

23. A computing device, comprising:
a memory configured to store a server application; and
a rendering subsystem coupled to the memory and configured to:
 render one or more server rendering elements to generate a reference image;
 render one or more client rendering elements comprising auxiliary data to generate a client auxiliary image, wherein the auxiliary data comprises rendering information for rendering the reference image;
 compress the reference image and the client auxiliary image or the reference image and auxiliary data to generate compressed client data; and
 transmit the compressed client data to the remote client device for display.

* * * * *